United States Patent
Colangelo

(10) Patent No.: US 10,351,272 B2
(45) Date of Patent: Jul. 16, 2019

(54) THREE CIRCUIT FILL SYSTEM FOR BLOW FILL SEAL CONTAINERS

(71) Applicant: R.P. Scherer Technologies, LLC, Carson City, NV (US)

(72) Inventor: Kevin Colin Colangelo, Gurnee, IL (US)

(73) Assignee: R.P. SCHERER TECHNOLOGIES, LLC, Las Vegas, NV (US)

( * ) Notice: Subject to any disclaimer, the term of this patent is extended or adjusted under 35 U.S.C. 154(b) by 0 days.

(21) Appl. No.: 15/236,993

(22) Filed: Aug. 15, 2016

(65) Prior Publication Data
US 2016/0347485 A1     Dec. 1, 2016

Related U.S. Application Data

(62) Division of application No. 13/434,566, filed on Mar. 29, 2012, now Pat. No. 9,440,754.

(51) Int. Cl.
*B65B 3/00* (2006.01)
*B65B 3/02* (2006.01)
(Continued)

(52) U.S. Cl.
CPC ............... *B65B 3/006* (2013.01); *B08B 9/08* (2013.01); *B65B 3/022* (2013.01); *B65B 3/04* (2013.01);
(Continued)

(58) Field of Classification Search
CPC ....... B08B 9/08; B65B 2210/06; B65B 3/003; B65B 3/006; B65B 3/04; B65B 55/00; B65B 57/00; B67C 3/2642; B67C 3/28
(Continued)

(56) References Cited

U.S. PATENT DOCUMENTS

| | | | |
|---|---|---|---|
| 2,421,708 A | 6/1947 | McKinnis | |
| 4,353,398 A | 10/1982 | Weiler et al. | |

(Continued)

FOREIGN PATENT DOCUMENTS

| | | | |
|---|---|---|---|
| DE | 1461849 A1 | 5/1969 | |
| DE | 2657671 A1 | 6/1977 | |

(Continued)

OTHER PUBLICATIONS

Office Action dated Jun. 6, 2016, in counterpart application JP 2015-503588 (9 pages including English translation).
(Continued)

*Primary Examiner* — Timothy L Maust
(74) *Attorney, Agent, or Firm* — Venable LLP

(57) ABSTRACT

A system for filling a blow-fill-seal (BFS) container is provided. The system includes a first fluid circuit constructed to selectively deliver a purge fluid to an open BFS container. A second fluid circuit selectively delivers a product to the open BFS container. A third fluid circuit, having a vent line in fluid communication with the open BFS container and to the ambient, directs a bulk fluid comprising at least the purge fluid from the container when the purge fluid is introduced into the BFS container. The second circuit selectively delivers product when the first fluid circuit selectively does not deliver the purge fluid, and the second circuit selectively does not deliver product when the first circuit selectively delivers the purge fluid.

6 Claims, 10 Drawing Sheets

(51) Int. Cl.
*B08B 9/08* (2006.01)
*B65B 3/04* (2006.01)
*B67C 3/26* (2006.01)
*B67C 3/28* (2006.01)

(52) U.S. Cl.
CPC .............. *B67C 3/2642* (2013.01); *B67C 3/28* (2013.01); *B65B 3/003* (2013.01); *B65B 2210/06* (2013.01)

(58) Field of Classification Search
USPC .......... 141/5, 54, 57, 6, 61, 63, 7, 8, 83, 94; 53/113, 122, 433, 452, 453, 511, 77
See application file for complete search history.

(56) References Cited

U.S. PATENT DOCUMENTS

| | | | |
|---|---|---|---|
| 4,398,575 | A | 8/1983 | Brandon |
| 4,602,473 | A | 7/1986 | Hayashi et al. |
| 4,623,516 | A | 11/1986 | Weiler et al. |
| 4,637,438 | A | 1/1987 | Weiss |
| 4,671,762 | A * | 6/1987 | Weiler .................. B41J 2/1721 264/524 |
| 4,926,613 | A | 5/1990 | Hansen |
| 4,938,261 | A * | 7/1990 | Petri .......................... B67C 3/06 141/147 |
| 5,195,294 | A | 3/1993 | Baranowski |
| 5,195,298 | A | 3/1993 | Baranowski |
| 5,501,253 | A * | 3/1996 | Weiss .................... B67C 3/2614 141/198 |
| 6,112,780 | A | 9/2000 | Meheen |
| 7,111,652 | B2 | 9/2006 | Koide et al. |
| 7,730,912 | B2 | 6/2010 | Blichmann |
| 2004/0010242 | A1 | 1/2004 | Heyes et al. |
| 2005/0051572 | A1 | 3/2005 | Vogel et al. |
| 2007/0029000 | A1 | 2/2007 | Konno et al. |
| 2007/0086008 | A1 | 4/2007 | Schweighardt et al. |
| 2008/0246963 | A1 * | 10/2008 | Nakajima .......... G01N 15/0205 356/336 |
| 2010/0094218 | A1 | 4/2010 | Kriesel et al. |
| 2011/0186451 | A1 | 8/2011 | Dersjo et al. |
| 2012/0018928 | A1 | 1/2012 | Ramrakhyani et al. |
| 2013/0180619 | A1 | 7/2013 | Clusserath et al. |
| 2013/0255827 | A1 | 10/2013 | Colangelo et al. |
| 2015/0239594 | A1 | 8/2015 | Batema |

FOREIGN PATENT DOCUMENTS

| | | |
|---|---|---|
| EP | 0418080 A1 | 3/1991 |
| GB | 2230520 A | 10/1990 |
| JP | 63-44492 A | 2/1988 |
| JP | 2-139303 A | 5/1990 |
| JP | 2010-179939 A | 8/2010 |
| JP | 2011-37038 A | 2/2011 |
| KR | 10-2005-0110673 A | 11/2005 |

OTHER PUBLICATIONS

International Search Report and Written Opinion of the International Searching Authority issued in PCT/US2013/034419 (9 pages).

* cited by examiner

US 10,351,272 B2

THREE CIRCUIT FILL SYSTEM FOR BLOW FILL SEAL CONTAINERS

The present application is a divisional of U.S. application Ser. No. 13/434,566, filed on Mar. 29, 2012, the entire disclosure of which is incorporated by reference herein.

BACKGROUND

Field

Example aspects herein relate to a conditioning and filling system and method for filling blow-fill-seal containers which improves sterility and conditions the containers prior to filling with a product, such as a drug. More particularly, the disclosure relates to a system apparatus, and method which are particularly suitable for conditioning blow-fill-seal (BFS) containers used to contain injectible drugs.

BFS technology relates to automated processes by which plastic containers are formed, filled, and sealed in a continuous operation. BFS technology provides economical container closure processing with reduced operator handling and is often used for filling and packaging ophthalmics, and respiratory care products.

In a typical BFS process for manufacturing plastic vials, solid polymeric granules (polypropylene resin pellets) are melted and homogenized by applying increasing pressures and temperatures. Melted polypropylene is formed into tubes called "parisons". When the tubes reach a predetermined length, a mold closes around the parison and the parison is cut, creating an open vial. The parison is cut with a high temperature knife which melts the plastic, creating smoke as a by-product. A fill nozzle introduces the liquid product into each open vial. Upon filling, the open vial is sealed, and the mold opens, dispensing a sealed vial which contains the product.

SUMMARY

It would be advantageous to provide further improvements in the capabilities of BFS technology. The present disclosure relates to a system and method for conditioning and filling BFS containers in a way that, among other advantages, can meet high cleanliness standards, of which the Class 100 (ISO 5) standards are one example. According to one aspect of the invention, a system for filling a blow-fill-seal (BFS) container is provided. The system includes a first fluid circuit constructed to selectively deliver a purge fluid to an open BFS container. A second fluid circuit selectively delivers a product to the open BFS container. A third fluid circuit, having a vent line in fluid communication with the open BFS container and to the ambient, directs a bulk fluid comprising at least the purge fluid from the container when the purge fluid is introduced into the BFS container. The second circuit selectively delivers product when the first fluid circuit selectively does not deliver the purge fluid, and the second circuit selectively does not deliver product when the first circuit selectively delivers the purge fluid.

In another aspect, the invention relates to a method of performing a BFS conditioning operation.

This brief summary has been provided so that the nature of the invention may be understood quickly. A more complete understanding of the preferred embodiments of the invention can be obtained by reference to the following detailed description in connection with the attached drawings.

DETAILED DESCRIPTION

A system, method, and apparatus are provided for conditioning and filling BFS containers.

Throughout the formation and filling of BFS containers, sterile air is used, for example, to form the parison and inflate it prior to filling. In most operations, the three steps with the greatest potential for introducing exposure to particle contamination and/or surrounding air are those in which (1) the parison is cut, (2) the parison is moved under the fill nozzle, and (3) the fill nozzle is removed prior to sealing the container.

A critical area is defined as one in which the sterilized drug product, containers, and closures are exposed to environmental conditions that must be specially designed or controlled to maintain product sterility (21 C.F.R. § 211.42 (c)(10)). Activities conducted in such areas include manipulations (e.g., aseptic connections, sterile ingredient additions) of sterile materials prior to and during filling and closing operations.

This area is critical because exposed product is vulnerable to contamination and will not be subsequently sterilized in its immediate container. To maintain product sterility, therefore, it is essential that the environment in which aseptic operations (e.g., equipment setup, filling) are conducted be controlled and maintained at an appropriate quality.

One aspect of environmental quality is the particle content of the air. Particles are significant because they can enter a product as an extraneous contaminant, and can also contaminate it biologically by acting as a delivery vehicle for microorganisms. Potential contaminants include particles generated during the plastic extrusion, cutting, and sealing processes as well as smoke generated during cutting as described above.

In one example embodiment, air in the immediate vicinity of exposed sterilized containers/closures and filling/closing operations is considered to be of appropriate particle quality when the air has a per-cubic-meter particle count of no more than 3520 in a particle size range of 0.5 μm and larger when counted at representative locations normally not more than 1 foot away from the work site, within the airflow, and during filling/closing operations. This level of air cleanliness is also known as Class 100 (ISO14644-1, ISO 5). Of course this measure of air cleanliness is exemplary and is not to be considered a limitation of the invention, which may be practiced to achieve other cleanliness standards if applicable.

Figure 1A:
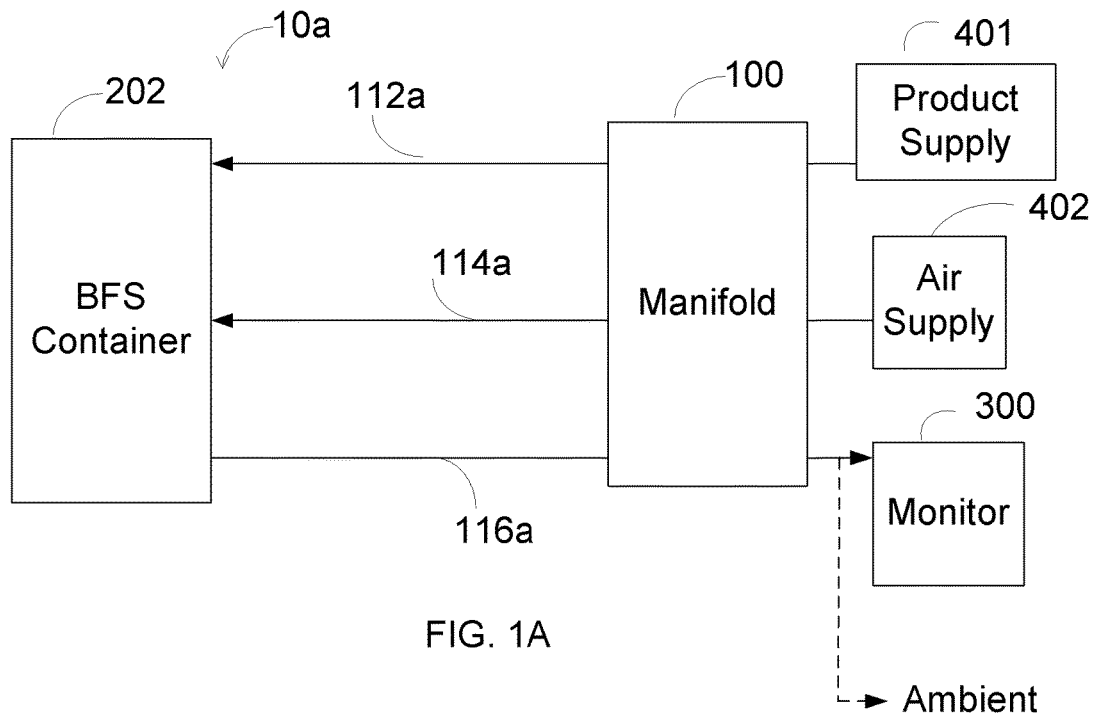
FIGS. 1A and 1B are schematic diagrams of embodiments of systems that include a conditioning and filling apparatus in accordance with an aspect of the invention.
Figure 1B:
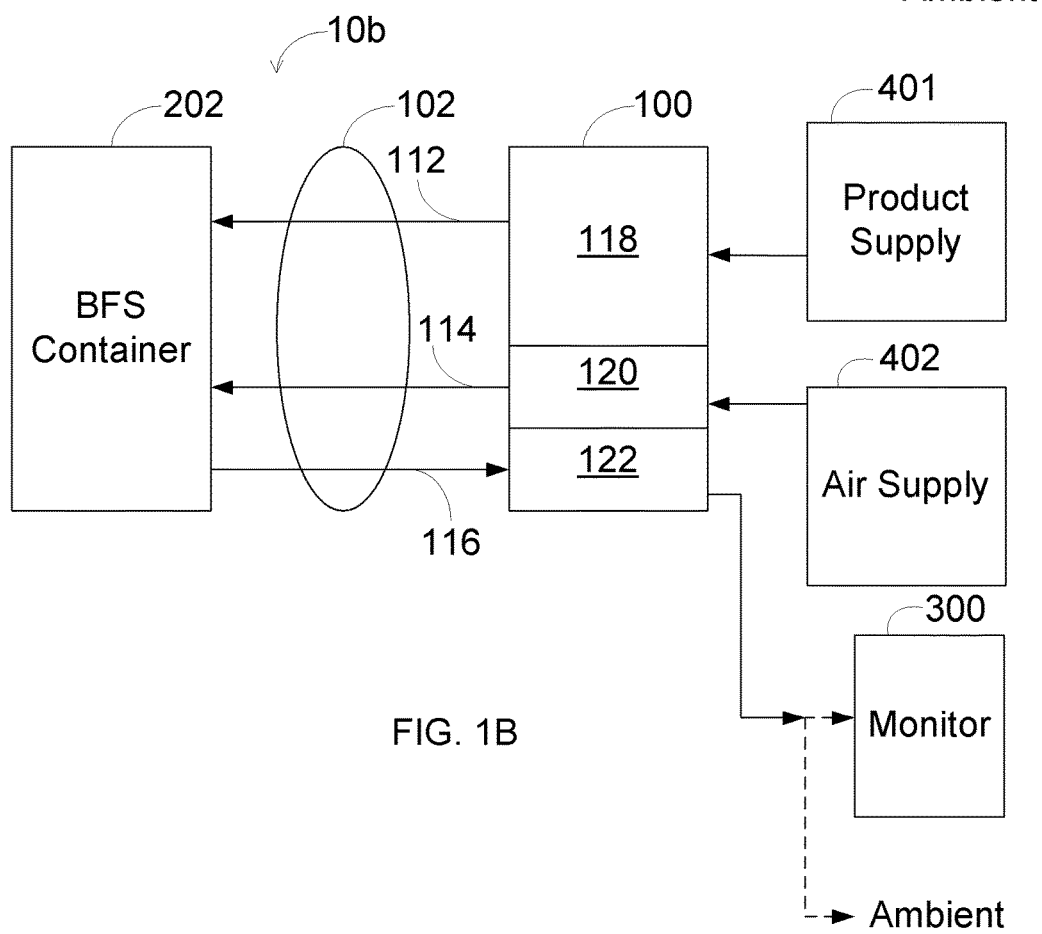

FIG. 1A shows an embodiment of a conditioning and filling system 10a in accordance with a first aspect of the invention. The system 10a includes a manifold 100 in fluid communication with a BFS container 202. The system 10a includes a product circuit 112a that directs product from a fluid supply 401 to the BFS container 202. The system 10a also includes an air circuit 114a that directs air or other pressurized gas to the BFS container 202 from an air supply 402. The system 10a further includes a ventilation circuit 116a that directs fluid from the BFS container 202 to ambient or other locations. Thus, the product circuit 112a, the air circuit 114a, and the ventilation circuit 116a are all in fluid communication with the BFS container. In the embodiment shown in FIG. 1B, the manifold 100 is constructed to selectively deliver product and air to the BFS container 202 through a fill nozzle 102 coupled to the manifold 100. The system 10b also is constructed to vent the BFS container 202 when the container 202 is being filled with product or air through a vent tube 116 in the fill nozzle 102. Optionally, the systems 10a and 10b shown in FIGS. 1A and 1B include a monitoring device 300 fluidly coupled to the manifold 100 to monitor fluid discharged from the BFS container 202. Also, optionally, such monitoring of the fluid is used to control of fluid and air through the manifold 100.

Conventionally, a BFS manifold only includes a product circuit and an air circuit, and does not include a ventilation circuit. Instead, in accordance with such conventional arrangements, pressurized air is introduced into an open BFS container for a predetermined period of time and the product is introduced into the container through the product circuit afterward without verifying the cleanliness of the BFS container prior to filling the container with product. By virtue of such a conventional system having only the two-circuit structure, as described, the fluid in the container is not simultaneously vented while the pressurized air is introduced. As a result, a possibility exists that any contaminants present in the container prior to the introduction of pressurized air may remain in the container even after the flow of air is discontinued. Therefore, employing conventional two-circuit fill systems introduces a possibility that contaminants may remain in the BFS container at the time of filling the container with product. Such contaminants may be harmful if the BFS container is filled with drugs administered to a patient intravenously.

On the other hand, the three-circuit filling and conditioning system in accordance with an aspect of the invention includes an additional third, ventilation circuit, which allows for a more robust flushing of the interior of the BFS container prior to filling with product. Such flushing can provide cleanliness inside the BFS container that is suitable for intravenous drugs.

Figure 2:
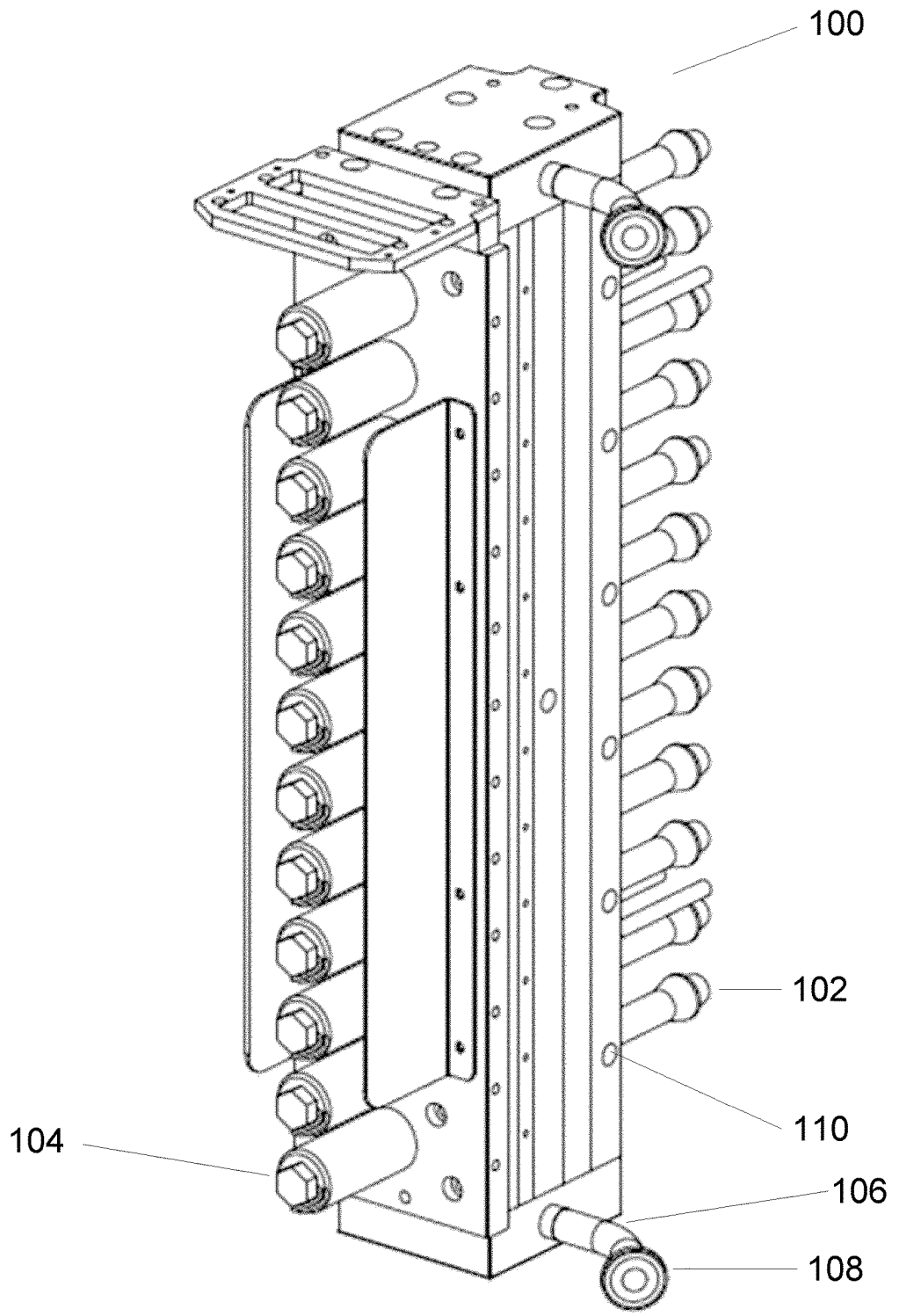
FIG. 2 is an isometric view of a manifold in accordance with an aspect of the invention, showing a side, the top, and an end.

FIG. 2 is an isometric view of an embodiment of the manifold 100 of FIG. 1 in accordance with another aspect of the invention, showing a side, the top, and an end. The manifold 100 has a plurality of fill nozzles 102 each of which facilitates conditioning and filling of corresponding BFS containers 202 (FIG. 1) which have reached the stage of processing where the containers 202 are open and in a mold, as discussed above. The manifold 100 includes a plurality of solenoid assemblies 104, described further hereinbelow. In the embodiment shown in FIG. 2, each solenoid 104 corresponds to one fill nozzle 102. It will be appreciated by those skilled in the art, however, that the arrangement of solenoids 102 and fill nozzles 102 shown in FIG. 2 is exemplary, and that other arrangements are possible.

Figure 3:
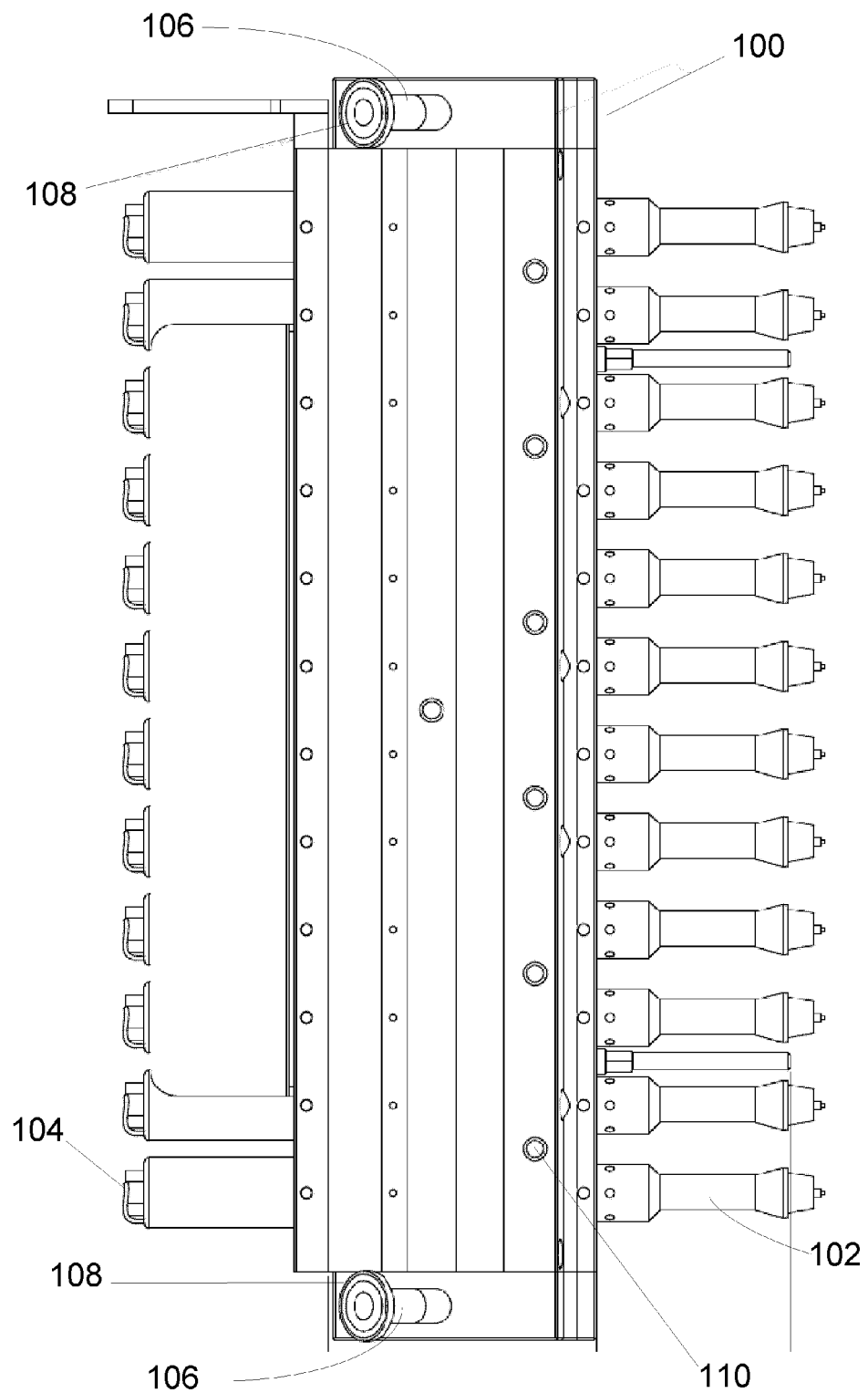
FIG. 3 is an elevation view of the manifold of FIG. 2, viewed from the side shown in FIG. 2.

FIG. 3 is an elevation view of the manifold of FIG. 2, viewed from the side shown in FIG. 2. The manifold 100 includes product inlets 106 at the ends of the manifold 100. The product inlets 106 have fittings 108 to connect to a product supply 401 (FIG. 1). The product inlets 106 direct product from the product supply 401 into the manifold 100, which has at least one internal product passageway that distributes the product to each of the fill nozzles 102. A plurality of ventilation ports 110 are also formed in the side of the manifold 100.

Figure 4:
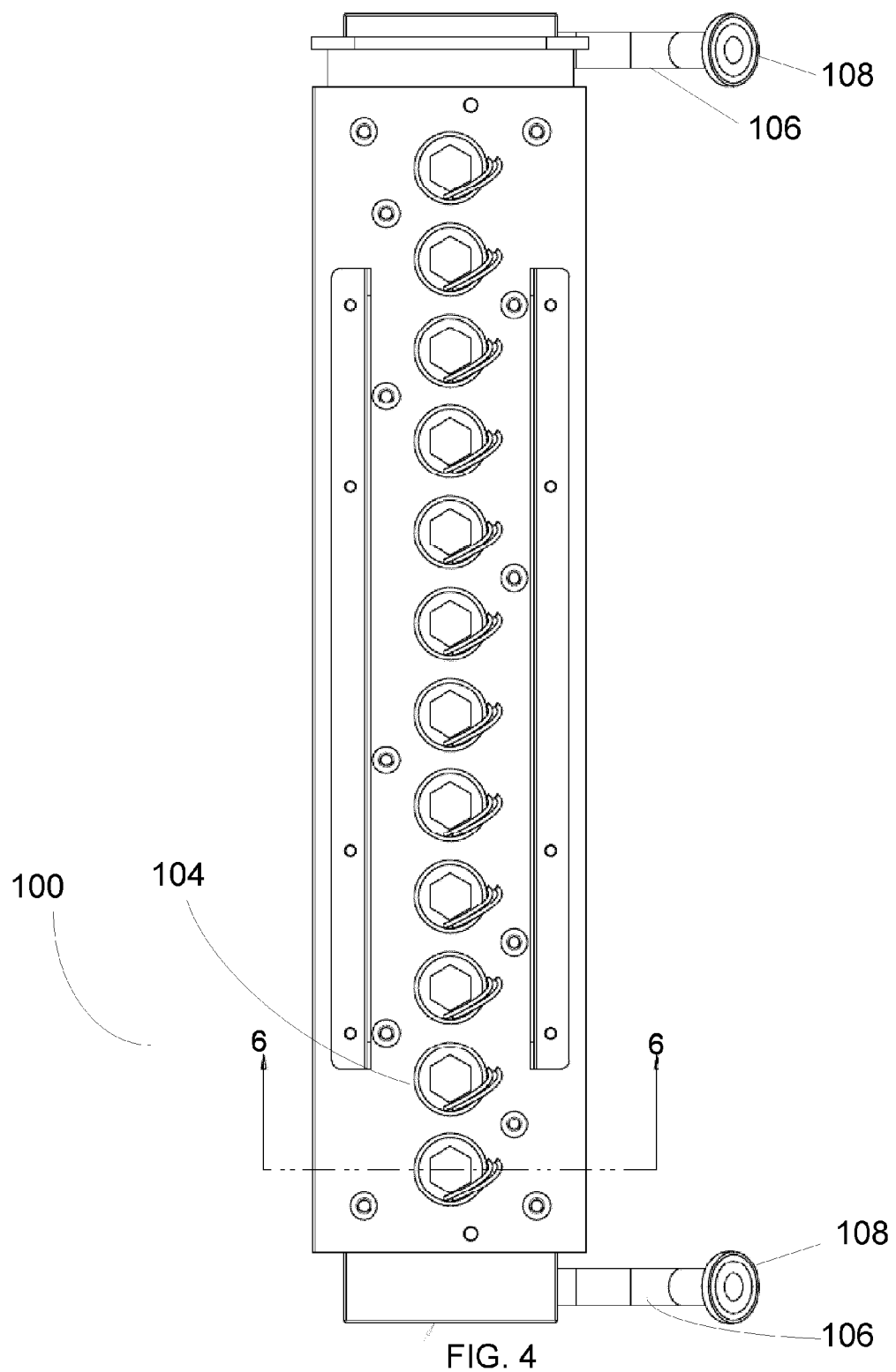
FIG. 4 is a plan view of the manifold of FIG. 2.
Figure 5:
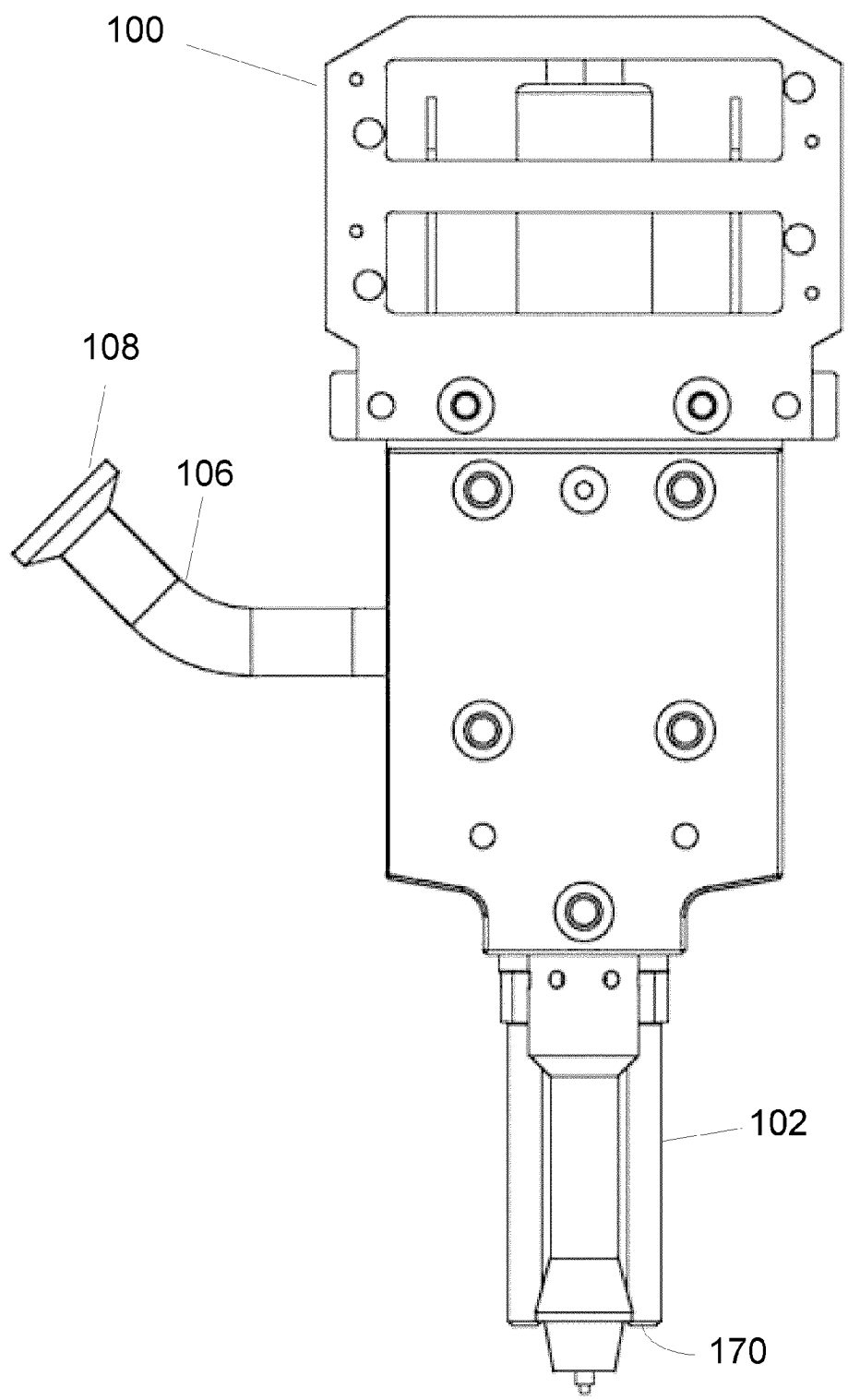
FIG. 5 is an elevation view of the manifold of FIG. 2, viewed from the end shown in FIG. 2.

FIG. 4 shows a plan view of the manifold 100 viewed showing the plurality of solenoids 104 arranged between the product inlets 106. FIG. 5 shows an elevation view of the manifold 100 of FIG. 3 viewed from an end thereof. The tip of the fill nozzle 102 has an annular flange 170, termed a mold stop, which seals with a rim of an open and as-yet unfilled BFS container 202 (FIG. 1). Prior to filling and sealing the container 202, a conditioning process is performed to remove from the container any contaminants that may have been introduced during the preceding manufacturing steps in the formation of the container.

Figure 6:
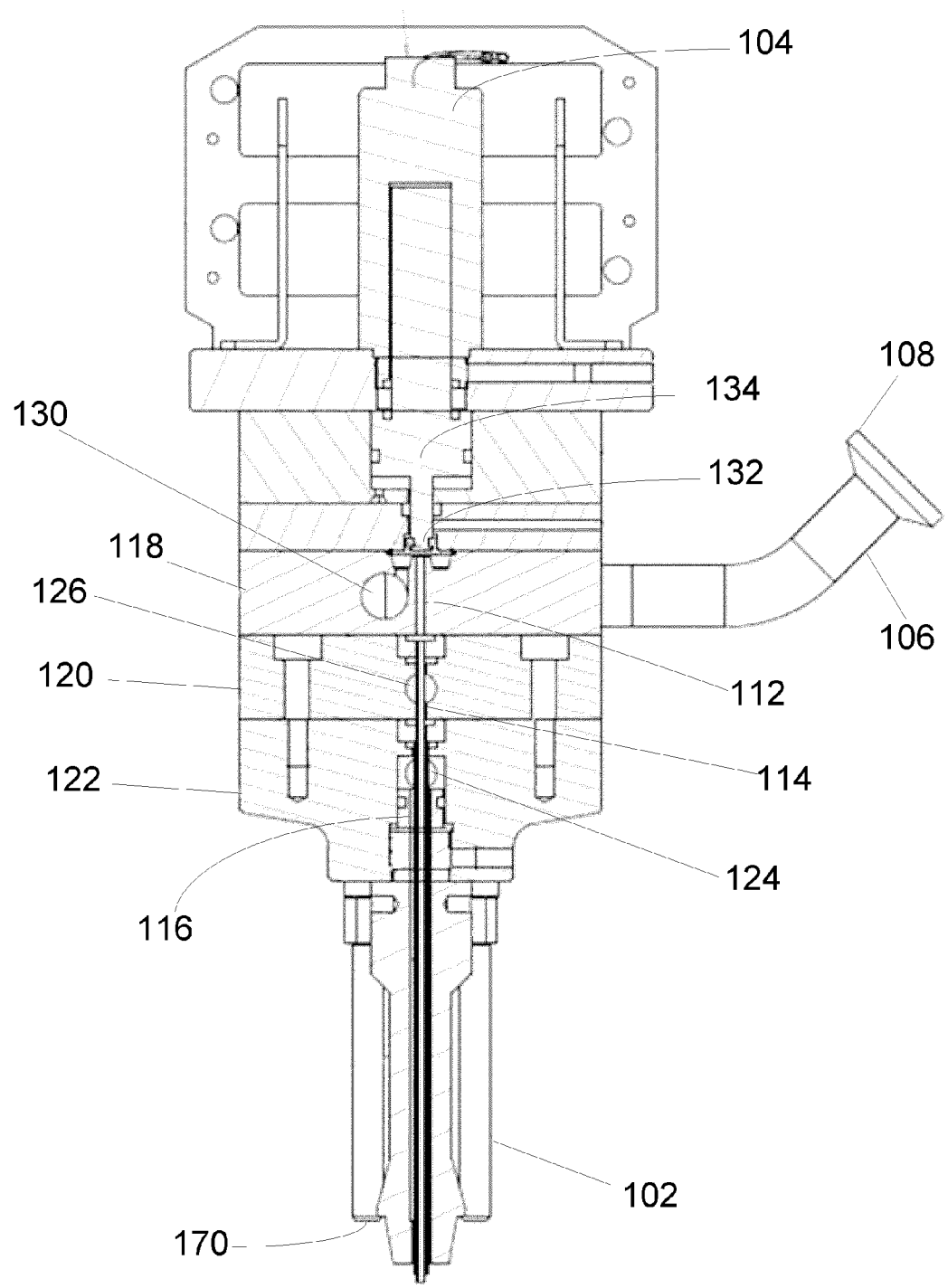
FIG. 6 is a sectional view of the manifold of FIGS. 2 to 5 taken along line 6-6 in FIG. 4.

FIG. 6 is a view of the manifold 100 taken along section line 6-6 in FIG. 4. Each fill nozzle 102 extends from a nozzle block 122 of the manifold 100. In one embodiment the fill nozzle 102 includes three concentric tubes, 112, 114, 116, each of which comprises a portion of a corresponding fluid circuit. Each tube 112, 114, and 116 extends at least partially through the fill nozzle 102. A first, central tube 112 of the fill nozzle 102 is a product tube that directs product from the manifold 100 into the BFS container 202. A second tube 114, concentrically surrounding the product tube 112, is an air tube, which directs pressurized air (or other gases) from the manifold 100 into the container 202. A third tube 116, concentrically surrounding the air tube 114, is a vent tube, which in one embodiment directs exhaust gases from the container 202 into the manifold 100, as described below.

The product tube 112, air tube 114, and vent tube 116 extend coaxially through the fill nozzle 102 to corresponding connection sections, termed "blocks", of the manifold 100. Each block of the manifold has an internal passageway that fluidly couples the respective tubes 112, 114, 116 of the fill nozzle 102 to one or more corresponding ports of the manifold 102. The product tube 112 extends approximately from the free end of the fill nozzle 102 to a metering block 118 which is constructed for fluid coupling to the product supply 401. The air tube 114 extends approximately from the free end of the fill nozzle 102 to a fill tube retainer block 120, which is constructed for fluid coupling to the supply of air 402. The vent tube 116 extends approximately from the free end of the fill nozzle 102 to the nozzle block 122 which is fluidly coupled to the ventilation ports 110 (FIG. 3) formed in the side of the manifold 100.

The vent tube 116 extends to a vent passageway 124 formed in the nozzle block 122. The vent passageway 124 extends substantially transverse to the axis of the vent tube 116. In the embodiment of the manifold 100 shown in FIGS. 2 to 5, the vent passageway 124 extends past each of the fill nozzles 102 and the vent passageway 124 is in fluid communication with ventilation ports 110 formed in the nozzle block 122 along the side of the manifold 100 (FIG. 3). The vent tube 116, vent passageway 124, and the ventilation ports 110 form a portion of a ventilation circuit that directs fluid from the BFS container 202 through the fill nozzle 102 and the vent passageway 124 out of the manifold 100.

The product tube 112 and the air tube 114 pass axially through the nozzle block 122. At least one seal is present between the nozzle block 122 and the air tube 114 to prevent fluid communication between the air tube 114 and the vent passageway 124, as described in further detail below.

The fill tube retainer block 120 is coupled to the nozzle block 122 on a side of the nozzle block 122 opposite the fill nozzle 102. Although not shown in FIGS. 2 to 6, the fill tube retainer block 120 is constructed for fluid coupling to the supply of pressurized air or other gas. Such fluid connections can include threaded or unthreaded connectors, or other types, as will be appreciated by those of ordinary skill in the art. The air tube 114 of the fill nozzle 102 extends approximately from the free end of the fill nozzle 102 to an air passageway 126 formed in the fill tube retainer block 120. As shown in FIG. 6, the air passageway 126 extends substantially transversely to the axis of the air tube 114. The air passageway 126, the air tube 114, and the pressurized supply of gas form part of an air circuit for delivering air to the BFS container 202.

The product tube 112 extends axially through the fill tube retainer block 120. At least one seal is present between the fill tube retainer block 120 and the product tube 112 to prevent fluid communication between the product tube 112 and the air passageway 126. The supply of pressurized air 402 to the air passageway 126 can be remotely started and discontinued in accordance with a filling sequence, described in further detail hereinbelow. Though not shown in FIGS. 2 to 5, it will be appreciated that control of air flow in the air circuit can be accomplished by, for example, one or more valves in the air circuit, as will be appreciated by those of ordinary skill in the art.

A metering block 118 is coupled to the fill tube retainer block 120 on a side of the fill tube retainer block 120 opposite the nozzle block 122. A product passageway 130 is formed in the metering block 118 extending substantially transverse to the axis of the product tube 112. The product passageway 130 extends to the ends of the manifold 100 and the product passageway 130 is in fluid communication with the product inlets 106, described above.

Adjacent to the metering block 118 are a diaphragm 132 and a corresponding one of the plurality of solenoids 104. The diaphragm 132 is in fluid communication with the product passageway 130 on one side and the product tube 112 on the opposite side. The diaphragm 132 surrounds an upper open end of the product tube 112, and moves relative to the upper surface of the metering block 118 to control the flow of product from the product passageway 130 into the product tube 112.

Each solenoid 104 has an electrically actuated piston 134 above the diaphragm 132. In a de-energized state, the piston 134 remains in the position shown in FIG. 6, in which the piston 134 is seated on the diaphragm 132, which urges the diaphragm 132 into sealing contact with the metering block 118 between the product passageway 130 and the product tube 112. When the solenoid 104 is energized, the piston 134 lifts axially away from the metering block 132. The fluid pressure in the product supply passageway 130 displaces the diaphragm 132 axially away from the metering block 118, permitting product to flow from the product passageway 130 into the product tube 112. When the solenoid 104 is de-energized, the piston 164 returns to the position shown in FIG. 6 to again seal the diaphragm 132 against the metering block 118, thereby discontinuing the flow of the product from the inlet 106 to the product tube 112.

Figure 7:
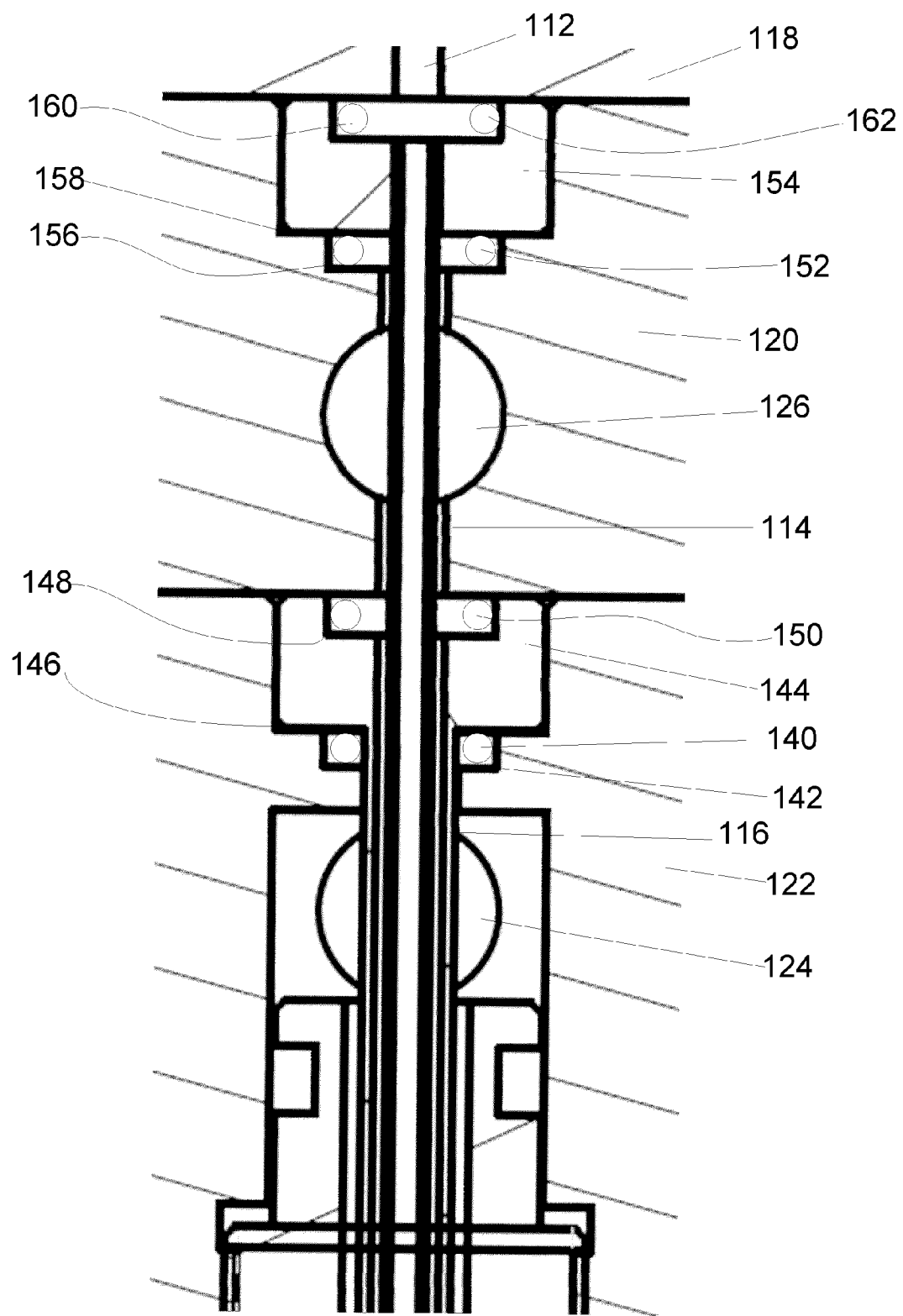
FIG. 7 is an exploded view of a portion of the sectional view of FIG. 6.

FIG. 7 is an exploded view of the section of the manifold 100 shown in FIG. 6. FIG. 7 shows, in greater detail, the sealing arrangements between the vent tube 116, air tube 114, and product tube 112. As shown in FIG. 7, the air tube 114 and product tube 112 extend through the nozzle block 122 and the air tube 114 is sealed with respect to the nozzle block 122 by a first O-ring 140. The first O-ring 140 is seated in a first counterbore 142 formed in the nozzle block 122. A first annular ring 144 is seated in a second counterbore 146 formed adjacent to the first counterbore 142. The diameter of the second counterbore 146 is larger than the first counterbore 142. A counterbore 148 is formed in the upper side of the first annular ring 144 in which is seated a second O-ring 150 surrounding the air tube 114. The first and second O-rings 140 and 150 are sealed with the first annular ring 144 by virtue of the connection between the nozzle block 122 and the fill tube retainer block 120.

The air tube 114 and product tube 112 extend through the fill tube retainer block 120 and the air tube 114 is sealed with respect to the fill tube retainer block 120 by a third O-ring 152 and a second annular ring 154. The third O-ring 152 is seated in a third counterbore 156 formed in the fill tube retainer block 120. The second annular ring 154 is seated in a fourth counterbore 158 formed adjacent to the third counterbore 156. Fluid in the air tube 114 is sealed between the outer wall of the product tube 112, the lower surface of the second annular ring 154, and the third O-ring 152. The diameter of the fourth counterbore 158 is larger than the third counterbore 156. A counterbore 160 is formed in the upper side of the second annular ring 154 in which is seated a fourth O-ring 162 surrounding the product tube 112. The third and fourth O-rings 152 and 162 are sealed with the second annular ring 154 by virtue of the connection between the metering block 118 and the fill tube retainer block 120.

Figure 8:
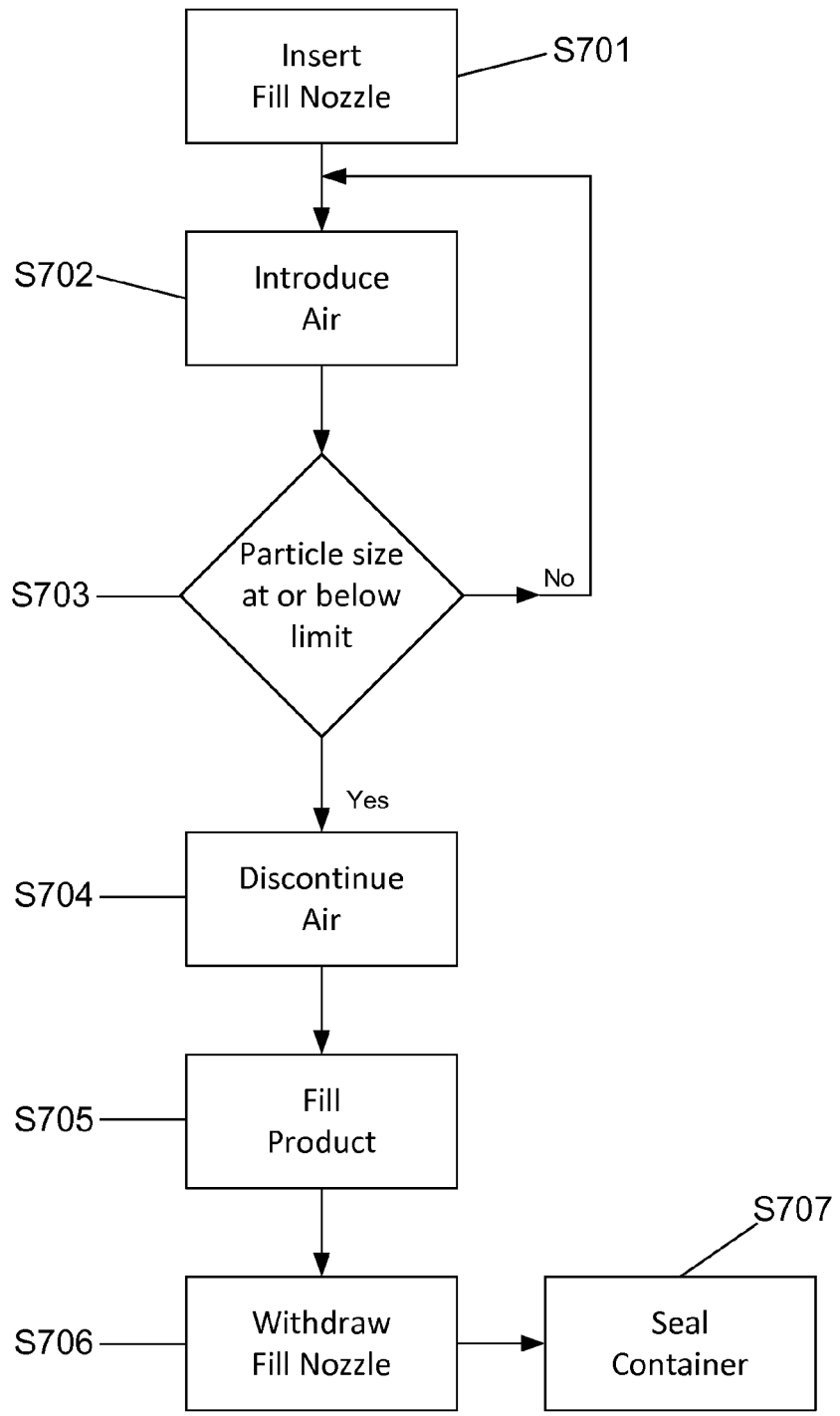
FIG. 8 is a process flow diagram for an embodiment of a method for conditioning BFS containers in accordance with an aspect of the invention.
Figure 9:
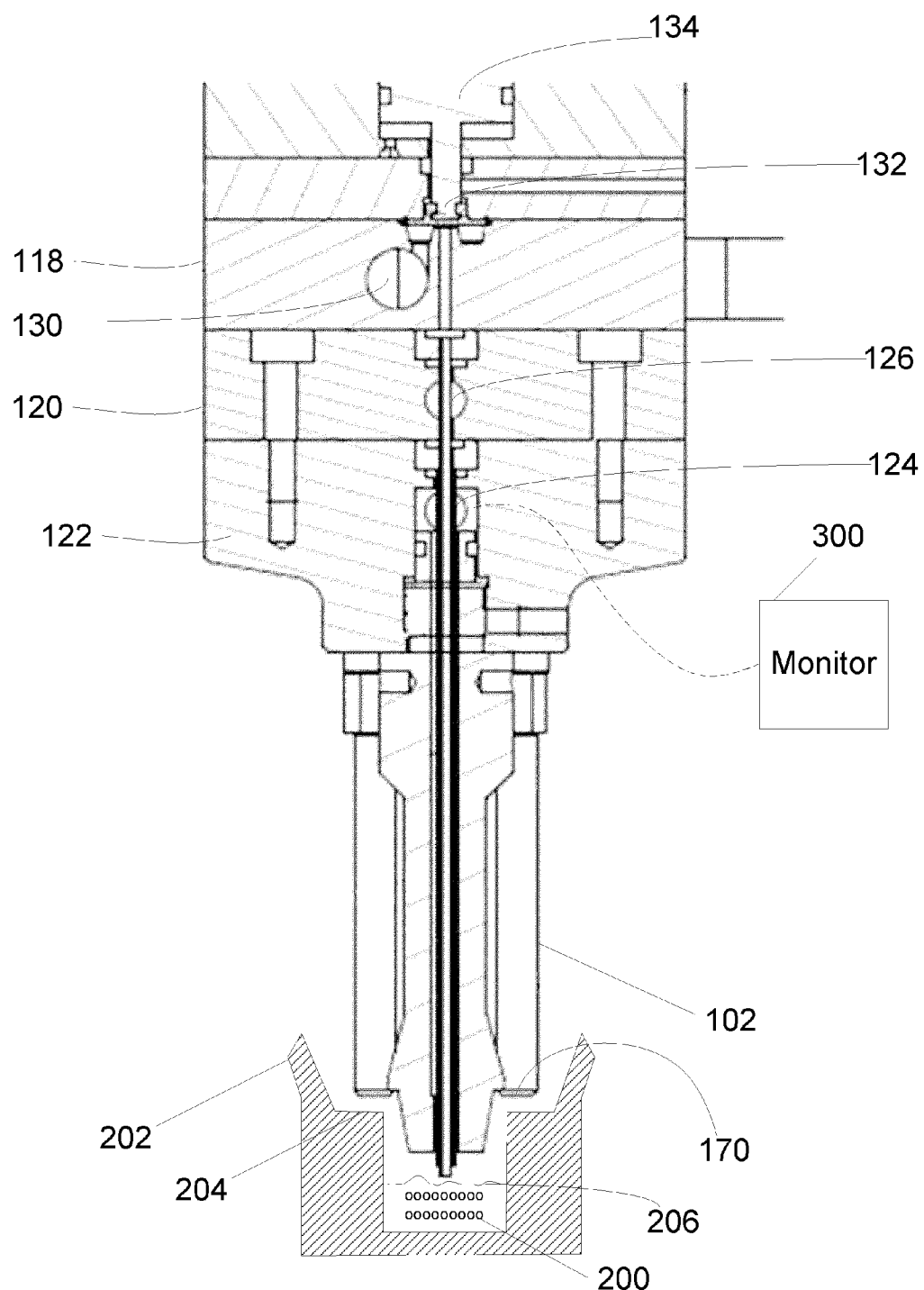
FIG. 9 is an exploded sectional view of a portion of the manifold of FIG. 6 shown with a BFS container prior to conditioning.

A conditioning process in accordance with another aspect of the invention will now be described with reference to FIGS. 8 to 10. During manufacturing of the BFS container 202, smoke and other particles 200 may accumulate in the open BFS container 202, as described hereinabove. In step S701 the tip of the fill nozzle 102 is introduced into the open BFS container 102 until the mold stop 170 contacts the rim 204 of the unsealed container 202. While the flow of product through the product tube 112 is stopped, in step S702 air from the air circuit is introduced into the open BFS container through the air tube 114 of the fill nozzle 102. Preferably, the air introduced is sterile, filtered air, which is substantially free of contaminants. In one embodiment, the air is introduced at a pressure of about 50 pounds per square inch.

The air introduced into the BFS container 202 in step S702 displaces the contaminants 200 in the BFS container 202 along with any fluid(s) 206 present in the container 202 prior to the introduction of the air from the air circuit. While the air is introduced into the container 202, a bulk flow, comprising the air and any contaminants 200, or fluid 206, or both, are discharged from the BFS container 202 through the ventilation circuit. Thus, contaminants 200 can be purged from the container 202 and directed away from the container 202 while fresh, make-up air that is substantially free of contaminants is being introduced into the container 202. This arrangement provides for a more thorough conditioning of the interior of the container 202 compared with the conventional two-circuit systems.

Optionally, one of the ventilation ports 110 (FIG. 3) of the manifold 100 that is in fluid communication with the container 202 is connected to a gas monitoring device 300, which is constructed to monitor the contaminants 200, and particularly the size of the contaminant particles, in the bulk flow. For example, in one embodiment, a laser particle scanner is employed as the monitoring device 300 to detect the size of the particles 200 in the discharged bulk flow. Further, in one embodiment, the flow of air into the BFS container 202 is controlled based on a measurement signal of the monitoring device 300. For example, the above-mentioned laser particle scanner can be used to determine the particle size of the contaminants 200, and where the particle size is below a predetermined size (YES in step S703), the flow of air into the BFS container 202 is discontinued in step S704. Otherwise, if the particle size is above the predetermined size (NO in step S703) the flow of air to the BFS container 202 continues until the particle size measured falls below the predetermined size. As will be appreciated by those of ordinary skill in the art, other control methods and/or devices can be employed to control the flow of air into the BFS container 202.

For example, in another embodiment, instead of the monitoring device 300 described hereinabove, the flow of air through the air circuit can be controlled by a timing device (not shown) so that the flow is discontinued after a predetermined time. The predetermined time can be based on empirical data compiled from monitoring the particle size during the conditioning process for multiple BFS containers. For example, through conditioning of multiple BFS containers using the monitoring device mentioned above, it may be possible to accumulate data indicative of the duration of time between the start of introduction of air into the BFS container and the time at which the particle size in the bulk flow though the ventilation circuit reaches a threshold particle size. Such duration data can be statistically compiled and analyzed to determine a suitable purge flow rate and duration to ensure a predetermined maximum acceptable particle size in the bulk fluid exiting the BFS container when air is introduced through the air circuit, which can be correlated to the cleanliness inside the BFS container. In one embodiment, air flow is introduced to the BFS container through the air circuit until the detected particle size is below 0.2 microns, in which case, when the air pressure is 50 psi and the BFS container size is 5 to 10 milliliters, the duration of flow has been observed to be about 1 second.

Figure 10:
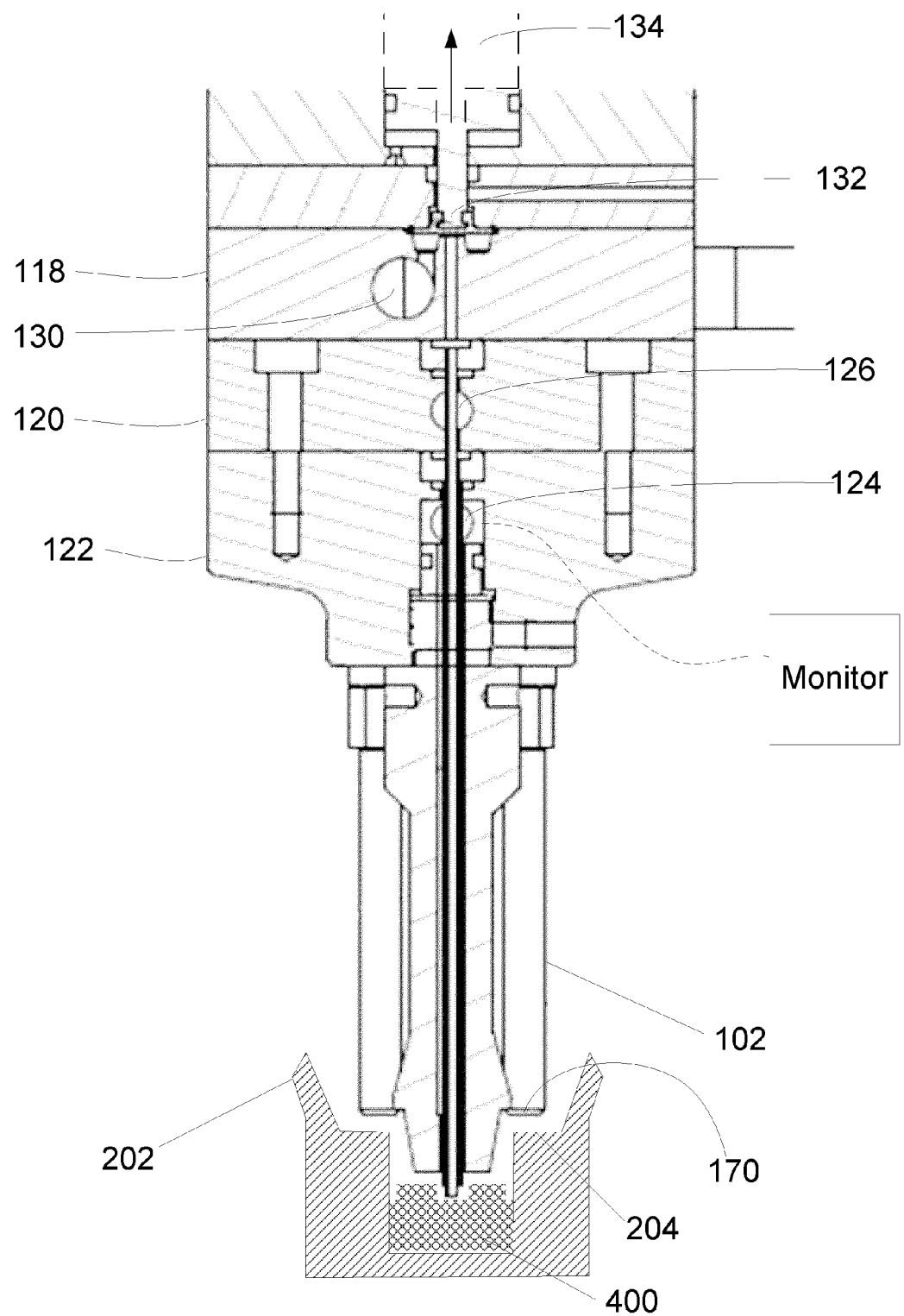
FIG. 10 is an exploded sectional view of a portion of the manifold of FIG. 6 shown with the BFS container of FIG. 9 filled with a product.

As shown in FIG. 10, upon discontinuation of the flow of air into the BFS container 202 in step S704, product is introduced into the BFS container 202 in step S705 through the product circuit by energizing the solenoid 104 to raise the piston 134 and permit product to flow around the diaphragm 132 from the product passageway 130 into the product tube 112 of the fill nozzle 102. The product is introduced into the conditioned BFS container 202, which further displaces a volume of gas through the ventilation circuit, which remains open to ambient through the vent ports 110 in the manifold 100.

After the BFS container 202 is filled with product in step S705, the fill nozzle 102 is retracted from the opening in the BFS container 202 in step S706 and the BFS container 202 is sealed in step S707 according to conventional BFS manufacturing methods.

Example aspects of the present invention have been particularly shown and described with respect to exemplary embodiments. However, it will be understood by those skilled in the art that changes in form and details may be made therein without departing from the scope and spirit of the invention.

What is claimed is:

1. A filling apparatus for a BFS container comprising:
   a fill nozzle constructed to be removably coupled to an open BFS container, the fill nozzle having a first fluid circuit for selectively delivering a purge fluid to the open BFS container, a second fluid circuit for selectively delivering a product to the open BFS container, and a third fluid circuit for directing a bulk flow comprised of at least the purge fluid from the BFS container;
   a first valve in fluid communication with the first fluid circuit, wherein the first valve is constructed for connection to a supply of purge fluid and wherein the first valve selectively controls the delivery of purge fluid to the first fluid circuit;
   a second valve in fluid communication with the second fluid circuit, wherein the second valve is constructed for connection to a supply of product and selectively controls the delivery of product to the second fluid circuit; and
   a monitoring device in fluid communication with the third fluid circuit, wherein the monitoring device is constructed to receive at least a portion of the bulk flow from the third fluid circuit and includes a particle detector that detects sizes of particles in the bulk flow, wherein delivery of the purge fluid by the first fluid circuit to the open BFS container is based upon a determined cleanliness of the bulk flow in the third fluid circuit.

2. The filling apparatus according to claim 1 comprising multiple fill nozzles, each having first, second, and third fluid circuits.

3. The filling apparatus according to claim 2, wherein each fill nozzle has formed axially therethrough a first tube corresponding to the first fluid circuit, a second tube corresponding to the second fluid circuit, and a third tube corresponding to the third fluid circuit, wherein the first, second, and third tubes are coaxial and are each fluidly coupled to their respective fluid circuits.

4. The filling apparatus according to claim 3, wherein the second valve is constructed as a diaphragm in fluid communication between the supply of product and to the second tube.

5. The filling apparatus according to claim 4, further comprising a solenoid that selectively displaces the diaphragm between an open position and a closed position, wherein in the open position product is permitted to flow through the second tube and in the closed position product is not permitted to flow through the second tube.

6. The filling apparatus according to claim 1, wherein the purge fluid is air.

* * * * *